June 21, 1955 W. A. STIRRAT 2,711,508

PHASE SHIFTING NETWORK

Filed Nov. 4, 1953

INVENTOR,
WILLIAM A. STIRRAT.

BY

Harry M. Saragovitz

ATTORNEY.

United States Patent Office 2,711,508

Patented June 21, 1955

2,711,508

PHASE SHIFTING NETWORK

William A. Stirrat, Red Bank, N. J., assignor to the United States of America as represented by the Secretary of the Army Application November 4, 1953, Serial No. 390,258

12 Claims. (Cl. 323—123)

(Granted under Title 35, U. S. Code (1952), sec. 266)

The invention described herein may be manufactured and used by or for the Government for governmental purposes, without the payment of any royalty thereon.

This invention relates to phase shifting networks and more particularly to a system for continuously varying the phase of an output signal at constant level with respect to an input signal.

Phase shifting systems are well known in the art and any network involving inductive or capacitive impedances will inherently perform some phase shifting function. By making the various elements of a simple network variable the degree of phase shift can be changed; however, in the usual simple phase shifting circuits the degree of phase shifting may not be linear, and the output voltage usually varies making such systems impractical for certain critical applications.

It is therefore an object of this invention to provide a phase shifting network.

It is a further object of this invention to provide a continuously variable phase shifting network.

Figure 1:
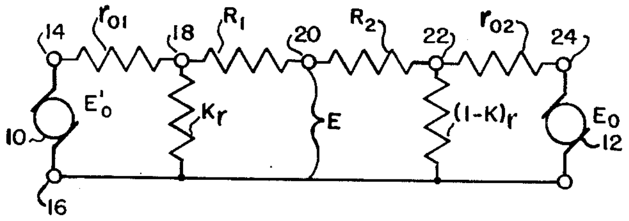
Figure 2:
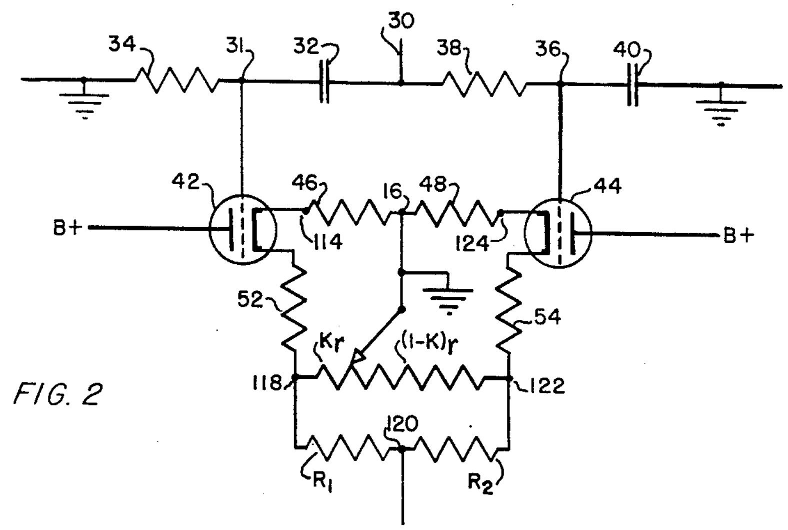
Figure 3:
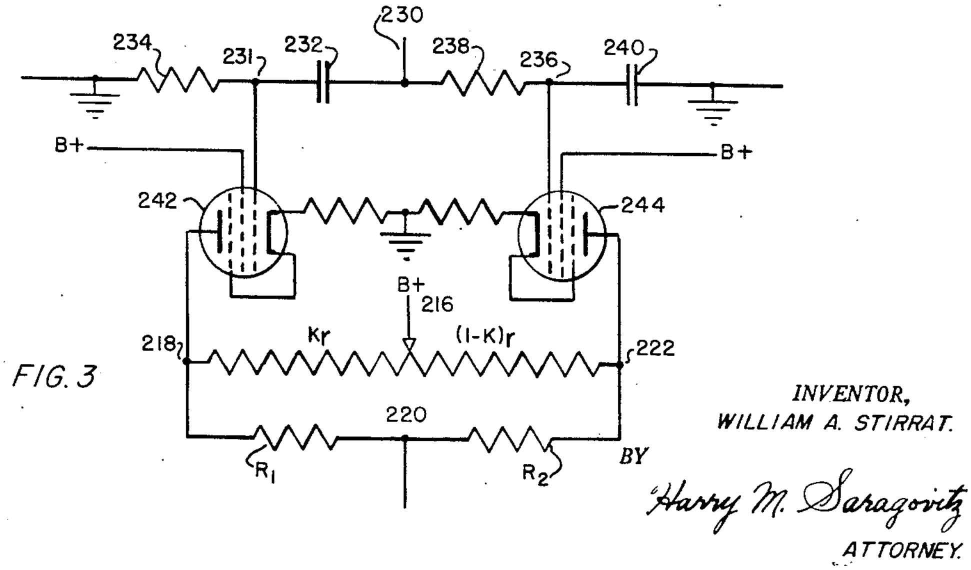

Other and further objects of this invention will become apparent from the following specification and drawings in which Fig. 1 shows the basic phase shifting network and Figs. 2 and 3 show applications of this network to vacuum tube circuits.

The circuits shown in Figs. 1–3 provide a continuous phase shift of 0°–90° with constant output voltage. Additional shifts of ±90° or 180° with constant output voltage can be provided by means of well known circuitry such as the phase inverter (providing 0° to 180° shift without output voltage change) and the grid input circuits of Figs. 2 and 3 (providing +45° or −45° shift without output voltage change in switching from −45° to +45° shift). By switching in the −45° to +45° and 0° to 180° phase shifting circuits any quadrant can be selected, a shift of 0°–90° (−45° to +45°) in each quadrant being accomplished by the circuitry in Figs. 1–3.

In Fig. 1 two generators 10 and 20 produce substantially equal signal voltages in quadrature. Generator 10 has a voltage $E'_0$ which is applied across terminals 14 and 16. A resistance $r_{01}$ connects the generator 10 to terminal 18 at the junction of resistors $R_1$ and $Kr$ which later resistance also connects to terminal 16. Resistance $R_1$ also connects to a second equal resistance $R_2$ at 20 which is an output terminal of the network. Resistance $R_2$ connects to the junction 22 of resistance $(1-K)r$ and resistance $r_{02}$. The other terminals 24 of $r_{02}$ and the other terminal 16 of $(1-k)r$ connect across the other generator 12, producing the quadrature input voltage $E_0$. The output signal E is taken across terminals 20 and 16. In this network $E_0$ is equal in amplitude to $E'_0$ but in quadrature phase relationship. The resistance $r_{01}$ is equal to the resistance $r_{02}$ and will be considered as $r_0$ in the following formulas. Similarly the resistance $R_1$ is equal to the resistance $R_2$ and will be considered as R.

In analysis of this network, when $K=1$, terminal 22 is effectively grounded and $$E=\frac{jE_0}{2\frac{r_0}{r}+2+\frac{r_0}{R}}$$

when $K=0$ $$E=\frac{E_0}{2\frac{r_0}{r}+2+\frac{r_0}{R}}$$

and when $K=\frac{1}{2}$ $$E=\frac{E_0(1+j)}{2\left(\frac{2r_0}{r}+1\right)}$$

or $$|E|=\frac{|E_0|}{2\left(\frac{2r_0}{r}+1\right)}$$

where $|E|$=magnitude of E and $|E_0|$=magnitude of $E_0$ then if $$\frac{1}{2\frac{r_0}{r}+2+\frac{r_0}{R}}=\frac{1}{\left(2\frac{r_0}{r}+1\right)}\sqrt{2}$$

or $$2(\sqrt{2}-1)=\frac{r}{r_0}(2-\sqrt{2})+\frac{r}{R}$$

then $$|E|_{(K=\frac{1}{2})}=|E|_{(K=1)}-|E|_{(K=0)}$$

This is practically realized as an approximation for values of $$\frac{r_0}{r}>2$$

For example if $$\frac{r_0}{r}=2\sqrt{2}$$

the deviation in the value of E will be less than 1.3% of its maximum value. The variations of the output voltage, with variations in $r_0$ (resulting from variation in tube constants in Figs. 2 and 3) approach zero as $r_0$ approaches infinity.

Since for practical purposes it would be undesirable to have two generators with the attended difficulties of controlling voltage and phase of the two, it would be desirable to use a single input whose phase is shifted positively and negatively by suitable circuits well known in the art. This is shown in Fig. 2 where the input 30 is shifted positively at point 31 by the network including condenser 32 and resistor 34 and is shifted negatively at 36 by the network including resistor 38 and condenser 40. Such phase shifting is practical when output points 31 and 36 have extremely high impedance loads or in the case of Fig. 1 if $r_{01}$ and $r_{02}$ were made extremely large; however, in this case the effective voltage across 18 and 16, which determines the output voltage, would be very small and hardly useable. For practical purposes vacuum tubes 42 and 44 may be added, whose grids reflect a high impedance load across the quadrature inputs 31 and 36 while the cathodes supply a satisfactorily high voltage to points 114 and 124 of the phase shifting network whose numbers correspond to the numbering of Fig. 1.

As in Fig. 1, the resistor 46 with the $$\frac{1}{gm}$$

of tube 42 is included in the effective resistance of $r_{01}$ and the resistor 48 with the $$\frac{1}{gm}$$

of tube 44 is included in the effective resistance $r_{02}$. The use of a cathode follower provides a relatively low contribution of the tube parameters to the effective impedance of $r_0$; thus, variations in the tube parameters cause but slight variations in $r_0$ while the effect of variations in $r_0$ is minimized by making $r_0$ large in comparison to $r$. A higher source impedance can be provided by putting the continuous phase shifting network in the plate circuits of the vacuum tubes as shown in Fig. 3 which has comparable elements numbered similarly to Figs. 1 and 2. In Fig. 3 the source impedance which is now the plate impedance is so high, particularly with pentodes, that the actual physical resistors 52 and 54 of Fig. 2 are not necessary; furthermore, the source impedances can be made so large through application of well known techniques, such as negative feedback, that variations in the tube parameters will have negligible effect.

The resistances $Kr$ and $(1-K)r$ may be conveniently supplied by a potentiometer across the plates 218—222. The high voltage supply for the tubes may then be through the variable tap of the potentiometer.

The circuit of Fig. 3 will satisfy the high input impedance requirements of a single source input and can supply a voltage output of constant magnitude and continuously variable phase, providing the impedance of the following stage is high compared with the impedances of the network.

Although resistances have been used throughout for simplicity, it is obvious that reactive elements could be substituted to meet the requirements of the circuit.

Having described my invention, what is claimed is:

1. A phase shifting network comprising: a first high impedance source of alternating voltage, a second high impedance source of alternating voltage in quadrature with said first alternating voltage, a first and second resistance connected in series between said first and second sources of alternating voltage, a third and fourth resistance connected in series between said first and second sources of alternating voltage, a point of zero potential with respect to said first and second sources of alternating voltage, the junction of said third and fourth resistances connected to said point of zero potential, said first and second resistances being equal, the sum of said third and fourth resistances being equal to a constant, and the output of said phase shifting network connected between the junction of said first and second resistances and said point of zero potential.

2. A phase shifting network comprising a first source of alternating voltage, a second source of alternating voltage in quadrature with the voltage of said first source, a first and second resistance in series across said first source of alternating voltage, a third and fourth resistance in series across said second source of alternating voltage, a fifth and sixth resistance connected in series between the junction of said first and second resistances and the junction of said third and fourth resistances, said fifth and sixth resistances being substantially equal, said first and third resistances being equal, the sum of said second and fourth resistances equal to a constant less than the value of said first and third resistances, and an output taken at the junction of said fifth and sixth resistances.

3. A phase shifting network comprising: a source of alternating voltage, a first means to provide a leading phase shift connected to said source of alternating voltage, a second means to provide a lagging phase shift connected to said source of alternating voltage, a first and second resistor connected in series across said first means, a third and fourth resistor connected in series across said second means, a fifth and sixth resistor connected in series between the junction of said first and second resistors and the junction of said third and fourth resistors, said fifth and sixth resistors being substantially equal, said first and third resistors being substantially equal, the sum of said second and fourth resistors being equal to a constant less than the value of said first and third resistors, and an output taken at the junction of said fifth and sixth resistors.

4. In a phase shifting network as in claim 3, a first and second vacuum tube, each having an input and an output, said first means connected to the input of said first vacuum tube, said first and second resistors connected in series across the output of said first vacuum tube, said second means connected to the input of said second vacuum tube, and said third and fourth resistors connected in series across the output of said second vacuum tube.

5. In a phase shifting network as in claim 4, said vacuum tubes, each having at least grid and cathode electrodes, said outputs connected to the cathodes of said vacuum tubes and said inputs connected to the grids of said vacuum tubes.

6. In a phase shifting network as in claim 4, said first and second vacuum tubes each having at least grid and plate electrodes, said inputs connected to said grids, and said outputs connected to said plates.

7. In a phase shifting network as in claim 4, said first and second vacuum tubes each having cathode, anode, and at least first and second grids, said inputs connected to said first grids, said outputs connected to said anodes, a source of voltage connected across said cathodes and said second grids, and load impedances connecting said source of voltage to said anodes.

8. A phase shifting network comprising a source of alternating voltage, a positive phase shifting network connected to said source of alternating voltage, a negative phase shifting network connected to said source of alternating voltage, a source of ground potential with respect to said alternating voltage, a first vacuum tube having input and output terminals, said positive phase shifting network connecting to said source of alternating voltage to said input terminal, a first resistance connecting said output terminal to ground, a second vacuum tube having input and output terminals, said negative phase shifting network connecting said source of alternating voltage to the input of said second vacuum tube, a second resistance connecting the output of said second vacuum tube to ground, a third and fourth resistance connected in series across the outputs of said first and second vacuum tubes, and the output of said phase shifting network taken between the junction of said third and fourth resistances and ground, the sum of said first and second resistances equal to a constant substantially less than the output impedances of said vacuum tubes.

9. In a phase shifting network as in claim 8, said first and second resistances comprising a potentiometer having two fixed contacts and a movable center contact, said fixed contacts connected across the outputs of said first and second vacuum tubes, said center tap connected to ground.

10. In a phase shifting network as in claim 8, said first resistance comprising the direct current path of said first vacuum tube, and said second resistance comprising the direct current path of said second vacuum tube.

11. A phase shifting network comprising; a source of alternating voltage, a ground connection for one terminal of said source of alternating voltage, a first condenser and a first resistor connected in series across said source of alternating voltage with said resistor grounded, a second resistor and a second condenser connected in series across said source of alternating voltage with said second condenser grounded, a first and second vacuum tube each having cathode, grid, and plate electrodes, the grid electrode of said first vacuum tube connected to the junction of said first condenser and resistor, the grid electrode of said second vacuum tube connected to the junction of said second resistor and condenser, a first impedance load connected between the cathode of said first vacuum tube and ground, a second impedance load connected between the cathode of said second vacuum tube and ground, a source of potential connected between the plates of said first and second vacuum tubes and ground, a third, fourth, fifth, and sixth resistors connected in series between the cathodes of said first and second vacuum tubes, a potentiometer having a grounded center tap, said potentiometer terminals connected to the junctions of said first and second and said third and fourth resistors, said phase shifting output obtained between the junction of said second and third resistors and ground.

12. A phase shifting network comprising a source of alternating voltage, a ground connection for one terminal of said source of alternating voltage, a first condenser and a first resistor connected in series across said source of alternating voltage with said resistor grounded, a second resistor and a second condenser connected in series across said source of alternating voltage with said second condenser grounded, a first and second vacuum tube having cathode, anode, and two grid elements, a first grid element of said first vacuum tube connected to the junction of said first condenser and resistor, a first grid element of said second vacuum tube connected to the junction of said second resistor and condenser, the cathodes of said first and second vacuum tubes connected together and to ground, a source of direct voltage with respect to ground connected to the second grid elements of said first and second vacuum tubes, a potentiometer connected across the anodes of said first and second vacuum tubes, a center tap to said potentiometer connected to said source of direct voltage, a first and second resistor connected in series between the anodes of said first and second vacuum tubes, said phase shifting output obtained between the junction of said first and second resistances and ground.

No references cited.